(12) United States Patent
Yu

(10) Patent No.: US 12,026,807 B2
(45) Date of Patent: Jul. 2, 2024

(54) HEAT MAP GENERATION METHOD, SERVER SIDE, AND READABLE STORAGE MEDIUM

(71) Applicant: BOE Technology Group Co., Ltd., Beijing (CN)

(72) Inventor: Jia Yu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/921,906

(22) PCT Filed: May 12, 2021

(86) PCT No.: PCT/CN2021/093343
§ 371 (c)(1),
(2) Date: Oct. 27, 2022

(87) PCT Pub. No.: WO2021/258887
PCT Pub. Date: Dec. 30, 2021

(65) Prior Publication Data
US 2023/0177743 A1    Jun. 8, 2023

(30) Foreign Application Priority Data
Jun. 24, 2020 (CN) .......................... 202010588385.3

(51) Int. Cl.
  *G06T 13/80*    (2011.01)
  *G06T 11/00*    (2006.01)
(52) U.S. Cl.
  CPC ............ *G06T 11/001* (2013.01); *G06T 13/80* (2013.01)

(58) Field of Classification Search
  CPC .............................. G06T 11/001; G06T 13/80
  See application file for complete search history.

(56) References Cited

U.S. PATENT DOCUMENTS

| 10,198,833 B2 * | 2/2019 | Hao ........................ G06Q 40/08 |
| 2019/0180480 A1 | 6/2019 | Gao et al. |
| 2021/0112377 A1 * | 4/2021 | Zhang ..................... G06F 16/29 |

FOREIGN PATENT DOCUMENTS

| CN | 105844681 A | 8/2016 |
| CN | 107967702 A | 4/2018 |

(Continued)

OTHER PUBLICATIONS

PCT/CN2021/093343 international search report.

*Primary Examiner* — Antonio A Caschera
(74) *Attorney, Agent, or Firm* — IPro, PLLC

(57) ABSTRACT

A heat map generation method, a server side, and a readable storage medium. The method includes: acquiring heat data generated in a specified geographic space within each preset time period, the heat data is used for representing the total heat data of one kind of object in one unit space in the geographic space within the preset time period; mapping each unit space with pixels in a designated display area, obtaining heat data of the pixels corresponding to each unit space, the designated display area and the designated geographic space have a same ratio, and the designated display area is part of a display area in a front-end display; and according to heat data corresponding to each pixel, and a level threshold of a color gradation, determining a color value corresponding to each pixel, and generating a heat map corresponding to the designated geographic space in each preset time period.

17 Claims, 4 Drawing Sheets

(56) References Cited

FOREIGN PATENT DOCUMENTS

| | | |
|---|---|---|
| CN | 110675728 A | 1/2020 |
| CN | 111754597 A | 10/2020 |

\* cited by examiner

HEAT MAP GENERATION METHOD, SERVER SIDE, AND READABLE STORAGE MEDIUM

CROSS-REFERENCE OF RELATED APPLICATIONS

The present application is a National Stage of International Application No. PCT/CN2021/093343, filed May 12, 2021, which claims the priority of the Chinese patent application No. 202010588385.3 filed to the China National Intellectual Property Administration on Jun. 24, 2020, and entitled "HEAT MAP GENERATION METHOD, SERVER SIDE, AND READABLE STORAGE MEDIUM", of which the entire contents are incorporated herein by reference.

FIELD OF INVENTION

The present disclosure relates to the technical field of Web application development, in particular to a heat map generation method, a server side, and a readable storage medium.

BACKGROUND

As an intuitive visualization method, a heat map has a good characteristic of comprehensively displaying geographic spatial characteristics and attribute characteristics of data, so that users can intuitively feel aggregation of specific objects in different geographic spaces through the heat map.

In the related art, the heat map is usually drawn at a front end. For example, evolution of passenger flow data of a mall within 24 hours is displayed in a web page in a form of animation within 24 seconds. When displaying, vector elements generated by the hourly passenger flow data are usually drawn into a vector map for animation playing. In this case, the amount of data received within one second during front-end processing may be too large, and the amount of data from the current one hour to the next one hour changes too much as well, which leads to exceeding the range of front-end data processing. At this time, reducing the amount of data to be processed is generally chosen, such as reducing a time density or reducing a unit density of geographical coordinates to reduce the amount of data, but this will lead to data distortion.

In view of this, how to reduce dependence of traditional heat map animation on a time dimension and a data density has become a technical problem urgent to be solved.

BRIEF SUMMARY

Embodiments of the present disclosure provide a heat map generation method, a server side, and a readable storage medium.

In a first aspect, an embodiment of the present disclosure provides a heat map generation method, applied to a server side, and including:

acquiring heat data generated in a designated geographic space within each preset time period, where the heat data is configured to represent total heat data of a kind of object in each unit space in the geographic space within the preset time period;

mapping each unit space with pixels in a designated display area, and obtaining heat data of the pixels corresponding to the each unit space according to heat data corresponding to the each unit space, where the designated display area and the designated geographic space have a same ratio, and the designated display area is part of a display area in a front-end display; and determining a color value corresponding to each pixel according to the heat data corresponding to each pixel, and a level threshold of a color gradation; and generating a heat map corresponding to the designated geographic space in each preset time period according to the color value corresponding to each pixel.

In some embodiments, the heat map is a lattice diagram.

In some embodiments, after generating a heat map corresponding to the designated geographic space in each preset time period, the method further includes:

sending the heat map in each preset time period to the front-end display for animation display.

In some embodiments, before determining the color value corresponding to each pixel, the method further includes:

determining a color value of each color level according to an initial color and grading quantity of the color gradation, and a color circle angle increment between two adjacent color levels in the color gradation, where the initial color is a color value corresponding to a lowest color level in the color gradation, and the color value is a hexadecimal color value; and determining the level threshold of each color level according to an initial threshold and the grading quantity, where the initial threshold is a level threshold corresponding to a highest color level in the color gradation, and increments of level thresholds of two adjacent color levels are same.

In some embodiments, the determining the color value of each color level includes:

converting the initial color into hue-saturation-lightness (HSL);

acquiring a hue H corresponding to the initial color;

determining a hue H of the highest color level according to the hue H corresponding to the initial color and the color circle angle increment;

obtaining an HSL corresponding to the highest color level by taking a saturation S and lightness L corresponding to the initial color as a saturation S and lightness L of the highest grade of color level; and calculating color values of remaining color levels by adopting a Gradient algorithm according to the initial color and the HSL corresponding to the highest color level.

In some embodiments, the determining the color value corresponding to each pixel includes:

determining two level thresholds closest to the heat data of the pixel corresponding to each unit space; and determining a value of a transition color between color levels corresponding to the two level thresholds as the color value corresponding to each pixel.

In some embodiments, the determining the value of the transition color between the color levels corresponding to the two level thresholds as the color value corresponding to each pixel, includes:

calculating a first difference value between the heat data corresponding to each pixel and a first level threshold, where the first level threshold is one of the two level thresholds;

calculating a second difference value between the two level thresholds;

calculating a third difference value between the color values corresponding to the two color levels corresponding to the two level thresholds; and determining the color value corresponding to each pixel according to the first difference value, the second difference value and the third difference value, and a color value corresponding to the first level threshold;

a ratio of a fourth difference value to the third difference value is a same as a ratio of the first difference value to the second difference value, where the fourth difference is a difference between the color value corresponding to each pixel and the color value corresponding to the first level threshold.

In some embodiments, the method further includes:

in response to the heat data of a pixel being greater than the initial threshold, determining the color value corresponding to the highest color level as the color value of the pixel.

In some embodiments, after generating the heat map corresponding to the designated geographic space in each preset time period, the method further includes:

obtaining a new heat map by performing Gaussian blur processing on the heat map according to a preset Gaussian threshold.

In some embodiments, the animation display adopts CSS animation, the CSS animation adopts a fade-out transition when playing the heat map, and a playing time interval between two adjacent heat maps is consistent.

In a second aspect, an embodiment of the present disclosure provides a server side, including:

an acquiring unit, configured to acquire heat data generated in a designated geographic space within each preset time period, where the heat data is configured to represent total heat data of a kind of object in each unit space in the geographic space within the preset time period;

a mapping unit, configured to map each unit space with pixels in a designated display area, and obtain heat data of the pixels corresponding to the each unit space according to heat data corresponding to the each unit space, where the designated display area and the designated geographic space have a same ratio, and the designated display area is part of a display area in a front-end display;

a generating unit, configured to determine a color value corresponding to each pixel according to the heat data corresponding to each pixel, and a level threshold of a color gradation, and generate a heat map corresponding to the designated geographic space in each preset time period according to the color value corresponding to each pixel; and a sending unit, configured to send the heat map to the front-end display.

In some embodiments, the heat map is a lattice diagram.

In some embodiments, after generating a heat map corresponding to the designated geographic space in each preset time period, the method further includes:

sending the heat map in each preset time period to the front-end display for animation display.

In some embodiments, before determining the color value corresponding to each pixel, the method further includes:

determining a color value of each color level according to an initial color and grading quantity of the color gradation, and a color circle angle increment between two adjacent color levels in the color gradation, where the initial color is a color value corresponding to a lowest color level in the color gradation, and the color value is a hexadecimal color value; and determining the level threshold of each color level according to an initial threshold and the grading quantity, where the initial threshold is a level threshold corresponding to a highest color level in the color gradation, and increments of level thresholds of two adjacent color levels are same.

In some embodiments, the determining the color value of each color level includes: converting the initial color into hue-saturation-lightness (HSL);

acquiring a hue H corresponding to the initial color;

determining a hue H of the highest color level according to the hue H corresponding to the initial color and the color circle angle increment;

obtaining an HSL corresponding to the highest color level by taking a saturation S and lightness L corresponding to the initial color as a saturation S and lightness L of the highest grade of color level; and calculating color values of remaining color levels by adopting a Gradient algorithm according to the initial color and the HSL corresponding to the highest color level.

In some embodiments, the determining the color value corresponding to each pixel includes:

determining two level thresholds closest to the heat data of the pixel corresponding to each unit space; and determining a value of a transition color between color levels corresponding to the two level thresholds as the color value corresponding to each pixel.

In some embodiments, the determining the value of the transition color between the color levels corresponding to the two level thresholds as the color value corresponding to each pixel, includes:

calculating a first difference value between the heat data corresponding to each pixel and a first level threshold, where the first level threshold is one of the two level thresholds;

calculating a second difference value between the two level thresholds;

calculating a third difference value between the color values corresponding to the two color levels corresponding to the two level thresholds; and determining the color value corresponding to each pixel according to the first difference value, the second difference value and the third difference value, and a color value corresponding to the first level threshold;

a ratio of a fourth difference value to the third difference value is a same as a ratio of the first difference value to the second difference value, where the fourth difference is a difference between the color value corresponding to each pixel and the color value corresponding to the first level threshold.

In some embodiments, the method further includes:

in response to the heat data of a pixel being greater than the initial threshold, determining the color value corresponding to the highest color level as the color value of the pixel.

In some embodiments, after generating the heat map corresponding to the designated geographic space in each preset time period, the method further includes:

obtaining a new heat map by performing Gaussian blur processing on the heat map according to a preset Gaussian threshold.

In some embodiments, the animation display adopts CSS animation, the CSS animation adopts a fade-out transition when playing the heat map, and a playing time interval between two adjacent heat maps is consistent.

In a third aspect, an embodiment of the present disclosure provides a readable storage medium, including:

a memory, where the memory is configured to store an instruction, and the instruction, when executed by a processor, causes an apparatus including the readable storage medium to implement the method described in the first aspect.

DETAILED DESCRIPTION OF THE EMBODIMENTS

Embodiments of the present disclosure provide a heat map generation method, a server side, and a readable storage medium, so as to solve a problem in the related art that traditional heat map animation is highly dependent on a time dimension and a data density.

In order to better understand the above technical solutions, the technical solutions of the present disclosure will be illustrated in detail below through accompanying drawings and specific embodiments. It should be understood that the embodiments of the present disclosure and specific features in embodiments are detailed descriptions of the technical solutions of the present disclosure, rather than limitation to the technical solutions of the present disclosure.

Embodiments of the present disclosure and the technical features in embodiments can be mutually combined in a case of no conflict.

Figure 1:
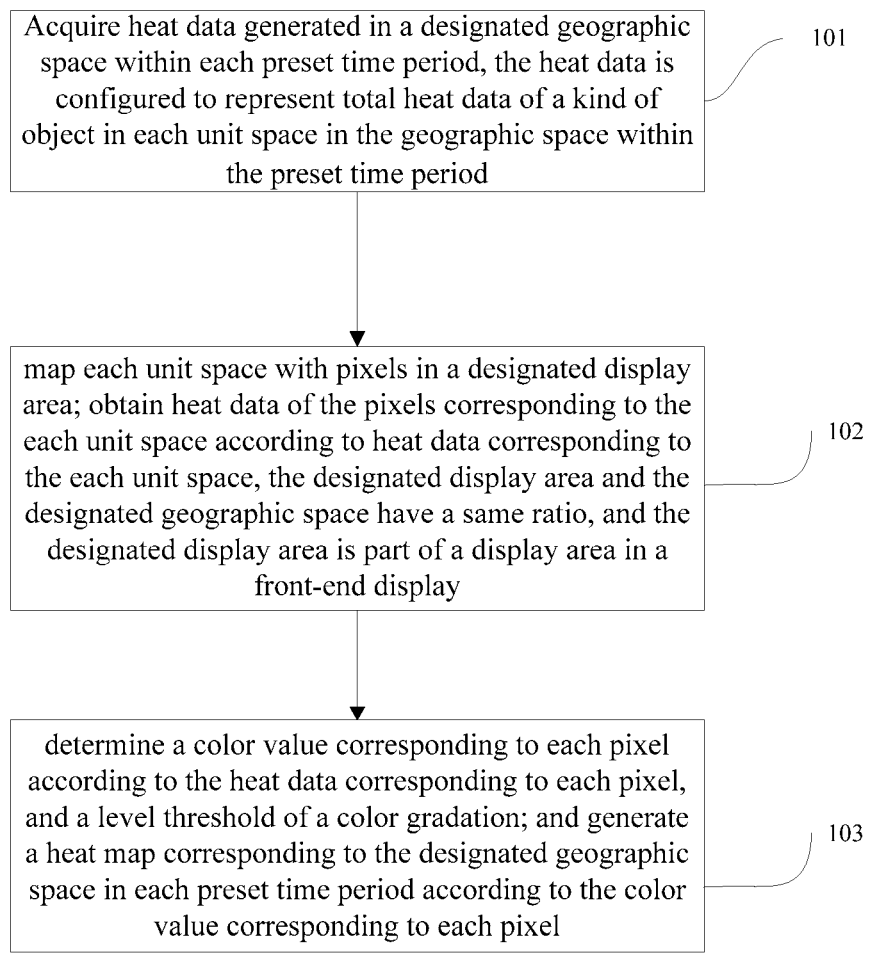
FIG. 1 is a flow diagram of some heat map generation methods provided by an embodiment of the present disclosure.

Please refer to FIG. 1, an embodiment of the present disclosure provides a heat map generation method, applied to a server side. A processing process of the method is as follows.

Step 101, heat data generated in a designated geographic space within each preset time period is acquired, where the heat data is configured to represent total heat data of a kind of object in each unit space in the geographic space within the preset time period.

For example, take a shopping mall as an example, a size of a geographic space corresponding to the shopping mall is 10 meters×20 meters (i.e., a designated geographic space), and a size of a unit space is 1 meter×2 meters, so that the designated geographic space is divided into 100 unit spaces. A data acquisition device collects a pedestrian flow in the 100 unit spaces every certain duration (one duration corresponds to one preset time period) and uploads it to a server side, so that the server side can acquire the pedestrian flow (i.e., heat data) in the designated geographic space within each preset time period.

In the embodiment provided by the present disclosure, the server side may be a local server or a cloud server, which is not limited.

It should be noted that the server side can acquire the heat data generated in the designated geographical space in each preset time period according to actual needs, that is, it is not limited to acquiring the heat data once in each preset time period, but also acquiring the heat data corresponding to the plurality of preset time periods every other preset time periods, or acquiring the heat data of all preset time periods at one time. In addition, the heat data is not limited to the pedestrian flow, for example, if the object is a vehicle, the heat data is a vehicle flow.

After acquiring the heat data in the designated space, step 102 may be executed.

Step 102, each unit space is mapped with pixels in a designated display area, and heat data of the pixels corresponding to each unit space is obtained according to heat data corresponding to each unit space, where the designated display area and the designated geographic space have a same ratio, and the designated display area is part of a display area in a front-end display.

For example, a resolution of the front-end display is 1920×1080, part of the display area in the front-end display is drawn as the designated display area, and the designated display area is of equal proportion to the size of the designated geographic space. The designated geographic space is 10 meters×20 meters, thus a size of the designated display area may be 1920×960, a size of one of the unit spaces is 1 meter×2 meters, accordingly, the corresponding pixel is 192×96. A mapping relationship is established between one unit space and the pixels 192×96 of the corresponding position. If the heat data corresponding to one of the unit spaces is 3, then the heat data of the pixel corresponding to the unit space is 3, and the heat data corresponding to other unit spaces will be deduced in the same way, which is not repeated.

Figure 2:
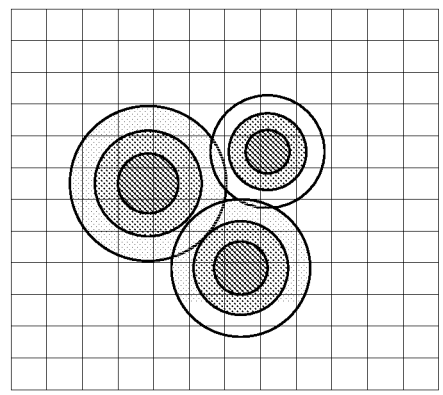
FIG. 2 is a schematic diagram of a mapping relationship between some unit spaces and pixels provided by an embodiment of the present disclosure.
Figure 3:
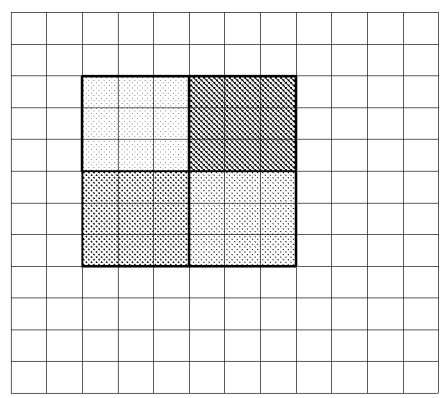
FIG. 3 is a schematic diagram of a mapping relationship between some other unit spaces and pixels provided by an embodiment of the present disclosure.

It should be noted that the above unit spaces can be divided into grid or circle (for example, the heat data is formed by radar) according to the different formed heat data. Please refer to FIG. 2 and FIG. 3, FIG. 2 is a schematic diagram of a mapping relationship between some unit spaces and pixels provided by the embodiment of the present disclosure, and FIG. 3 is a schematic diagram of a mapping relationship between some other unit spaces and pixels provided by the embodiment of the present disclosure. In FIG. 2 and FIG. 3, a small square represents one pixel, and a large square/circle represents the pixels mapped in one unit space.

After obtaining the heat data of the pixels corresponding to each unit space, step 103 may be executed.

Step 103, a color value corresponding to each pixel is determined according to the heat data corresponding to each pixel, and a level threshold of a color gradation, and a heat map corresponding to the designated geographic space in each preset time period is obtained according to the color value corresponding to each pixel.

Before determining the color value corresponding to each pixel, a color value of each grade of color level may further be determined according to an initial color and grading quantity of the color gradation, and a color circle angle increment between the two adjacent grades of color levels in the color gradation, where the initial color is a color value corresponding to the lowest grade of color level in the color gradation, and the color value is a color recorded in hexadecimal; and then a level threshold corresponding to each grade of color level is determined according to an initial threshold and the grading quantity, where the initial threshold is a level threshold corresponding to the highest grade of color level in the color gradation, and increments of the level thresholds corresponding to the two adjacent grades of color levels are the same.

The color value of each grade of color level may be determined in the following ways: first, the initial color is converted into hue-saturation-lightness (HSL), and a hue H corresponding to the initial color is acquired; then a hue H of the highest grade of color level is determined according to the hue H corresponding to the initial color and the color circle angle increment; then an HSL corresponding to the highest grade of color level is obtained by taking a saturation S and lightness L corresponding to the initial color as a saturation S and lightness L of the highest grade of color level; and finally, color values of the remaining color levels are calculated by adopting a Gradient algorithm according to the initial color and the HSL corresponding to the highest grade of color level.

For example, if the grading quantity of the color gradation is three, the initial color is green (the corresponding color value is #99ff66), and the color circle angle increment between the two adjacent grades of color levels in the color gradation is 60, then it can be determined that the color value of the first grade of gradation is #99ff66.

A color value of the third grade (i.e., the highest grade) of color level is calculated in the following mode:

first, the initial color (#99ff66) is converted into a value corresponding to an RGB color system, and a conversion result is: R:153, G:255, and B:102; and then an RGB value of the initial color is converted into HSL, and a conversion result is: H:100, S:60, and L:92.

H corresponding to the third grade of color level is 100+60=160.

An SL value of the third grade of color level is the same as an SL of the initial color, so the HSL values of the third grade of color level are respectively H:160, S:60, and L:92.

The RGB values corresponding to the HSL values of the first stage of color level and the second stage of color level are: R:153, G:255, and B:102, as well as R:102, G:255, and B:204 respectively.

The RGB values of the second grade of color level calculated by the Gradient algorithm are:

$$R=153+2\times(102-153)/3=119;$$

$$G=255+2\times(255-255)/3=255; \text{ and}$$

$$B=102+2\times(204-102)/3=170.$$

Thus the RGB values of the second grade of color level are: R:119, G: 255, and B:170.

The RGB values of the second grade of color level and the third grade of color level are respectively converted into hexadecimal data, and their color values may be obtained as #77ffaa and #66ffcc.

It should be understood that the above color values are only illustrative and do not represent the truly-used color level.

Figure 4:
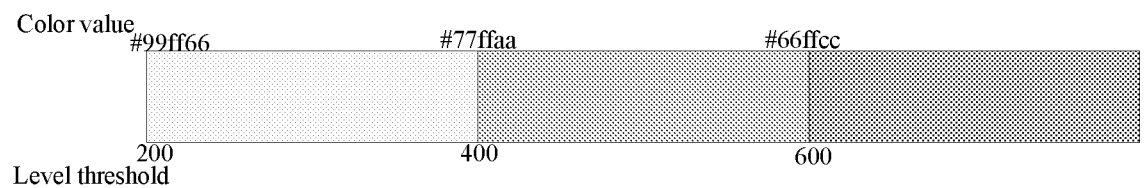
FIG. 4 is a diagram of a corresponding relationship between a color value and a level threshold of a color gradation provided by an embodiment of the present disclosure.

If the set initial threshold is 600 (which may be understood as a limit value of the heat data), the level threshold corresponding to the third grade of color level is 600, the level threshold corresponding to the second grade of color level is 400, and the level threshold corresponding to the first grade of color level is 200. The corresponding relationship between the above color value and the level threshold may refer to FIG. 4, and FIG. 4 is a diagram of a corresponding relationship between the color value and the level threshold of the color gradation provided by the embodiment of the present disclosure.

After determining that the color values of each color level in the color gradation are the corresponding level thresholds, the color value corresponding to each pixel in the designated display area may be determined according to the heat data.

The color value corresponding to each pixel may be determined in the following modes: two level thresholds closest to the heat data of the pixel corresponding to each unit space are determined; and a transition color between the color levels corresponding to the two level thresholds is determined as the color value corresponding to each pixel.

The determining the transition color between the color levels corresponding to the two level thresholds as the color value corresponding to each pixel may be implemented in the following modes: a first difference value between the heat data corresponding to each pixel and a first level threshold is calculated, where the first level threshold is one of the two level thresholds; a second difference value between the two level thresholds and a third difference value between the color values corresponding to the two color levels corresponding to the two level thresholds are calculated; and finally, the color value corresponding to each pixel is determined according to the first difference value, the second difference value and the third difference value, and the color value corresponding to the first level threshold, wherein a ratio of a fourth difference value between the color value of each pixel and the color value corresponding to the first level threshold to the third difference value is the same as a ratio of the first difference value to the second difference value.

For example, the heat data of one unit space is 280, the pixel corresponding to the heat space is 192×96, and then the heat data corresponding to the 192×96 pixels is 1280. HSL values corresponding to the two color values which are located at the first grade of color level (the level threshold is 200, and the color value is #99ff66) and the second grade of color level (the level threshold is 400, and the color value is #66ffcc) are respectively: R:153, G:255, B:102, R:102, G:255, and B:204. The RGB values of the pixel corresponding to one unit space are calculated by adopting the Gradient algorithm and are recorded as Rx, Gx, Bx, so:

$$(280-200)/(400-200)=(Rx-153)/(102-153)=(Bx-102)/(204-102); \text{ and}$$

it can be calculated that Rx=132.6, Bx=141.2, and G is 255. Therefore, the RGB values of the pixels corresponding to the heat data 280 of the unit space are R:132, G:255, and B:141, and the color value corresponding to the hexadecimal is #84ff8d.

The color value corresponding to the highest grade of color level is determined as the color value of one pixel if the heat data of one pixel is greater than the initial threshold. For example, if the heat data corresponding to one unit space is 500, the color value of the pixel corresponding to the unit space is the color value of the highest grade of color level, which is #66ffcc.

Similarly, the color values of the pixels corresponding to other unit spaces may be calculated, which will not be repeated here.

After the color value of each pixel corresponding to the designated area in each preset time period is calculated in the above way, one heat map corresponding to the preset time period may be obtained.

After the heat map corresponding to the designated geographical space in each preset time period is obtained, a new heat map may further be obtained by performing Gaussian blur processing on the heat map according to a preset Gaussian threshold.

The color value of each pixel in the heat map may be calculated according to the set Gaussian threshold, and the calculated data is superimposed on original data.

Figure 5:
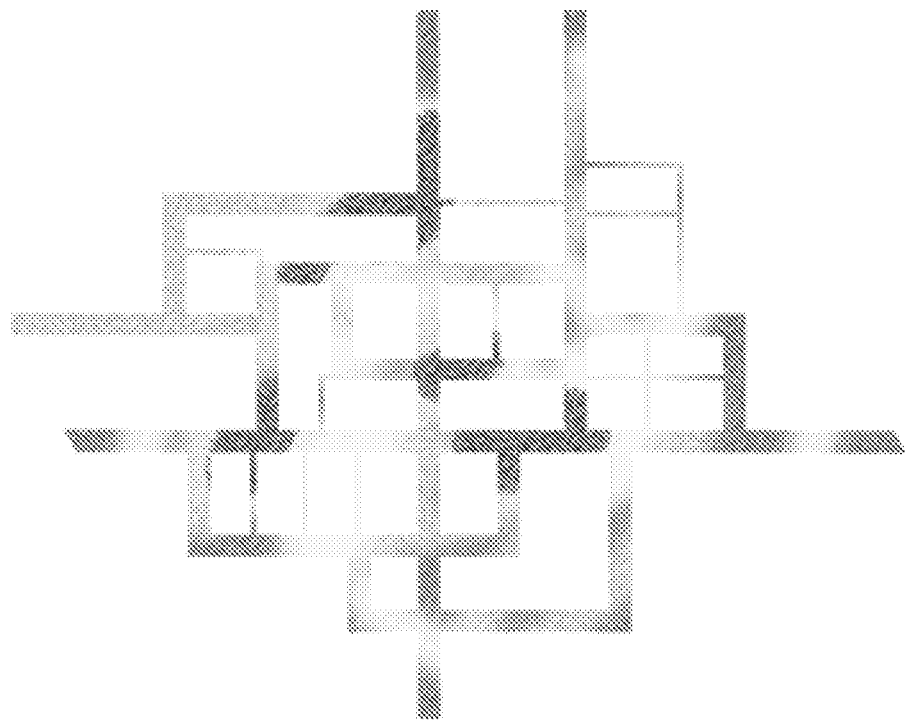
FIG. 5 is a heat map without Gaussian blur processing provided by an embodiment of the present disclosure.
Figure 6:
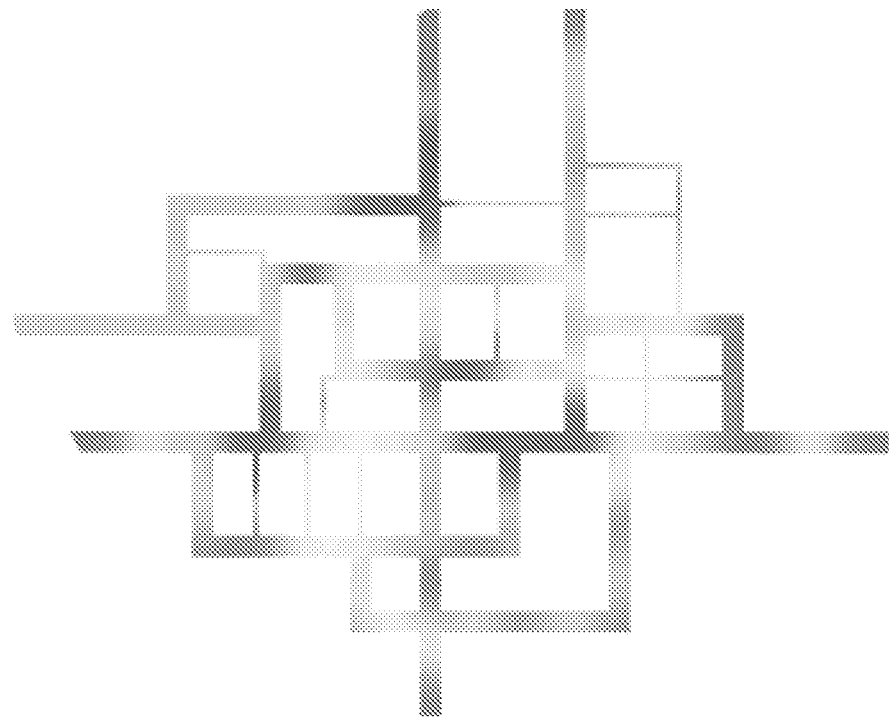
FIG. 6 is a heat map obtained by applying Gaussian blur processing to the heat map in FIG. 5 provided by an embodiment of the present disclosure.

For example, please refer to FIG. 5, which is a heat map without Gaussian blur processing provided by the embodiment of the present disclosure, and FIG. 6, which is a heat map obtained by applying Gaussian blur processing to the heat map in FIG. 5 provided by the embodiment of the present disclosure.

In the embodiment provided by the present disclosure, the heat map is named according to a preset naming format, and the preset naming format includes a function of the heat map, a date and time of generation.

For example, one heat map is named as: passengerFlow_20200101_200032.png, and the heat map following it is sequentially named as: passengerFlow_20200102_200032.png, passengerFlow_20200103_200032.png, ect.

These heat maps are stored in a chronological order, and time intervals between every two adjacent heat maps are the same.

In the embodiment provided by the present disclosure, the heat map is a lattice diagram. This allows the heat map generated by the server side to be directly used for the front-end display for heat animation display without the need to generate a vector map by using the heat data in the front-end display as in the related art, nor the need for applications in the front-end display to support vector map display, which can reduce data processing capacity of the front-end display.

After generating a heat map corresponding to the designated geographic space in each preset time period, the heat map corresponding to each preset time period may further be sent to the front-end display for animation display.

The heat map may be sent to the front-end display after one heat map is generated, which can effectively improve timeliness of heat animation display on the front-end display, and reduce the amount of data transmitted in one time between the server side and a front-end server.

In some embodiments, all the heat maps are sent to the front-end display at one time after all the heat maps are generated, in this way, the front-end server can sequentially acquire the heat map required for displaying the heat animation, so as to prevent loss of some heat maps during transmission.

The front-end display adopts CSS animation during animation display, the CSS animation adopts a fade-out transition when playing the heat map, and a playing time interval is consistent with a time interval of the two adjacent heat maps.

For example, if the heat maps are the plurality of heat maps from 20:00:00 to 24:00:00, the time of animation playing is 4 seconds. For another example, if the heat maps are the plurality of heat maps from 12:00:00 to 24:00:00, the time interval of animation playing is 12 seconds.

By processing a large amount of heat data on the server side and generating the heat map corresponding to each preset time period, the front-end display can directly use the heat map generated by the server for heat animation display without processing the large amount of heat data, which can effectively reduce the dependence of traditional heat map animation on the time dimension and the data density, and prevent the front-end display from failing in normally displaying the heat animation.

Figure 7:
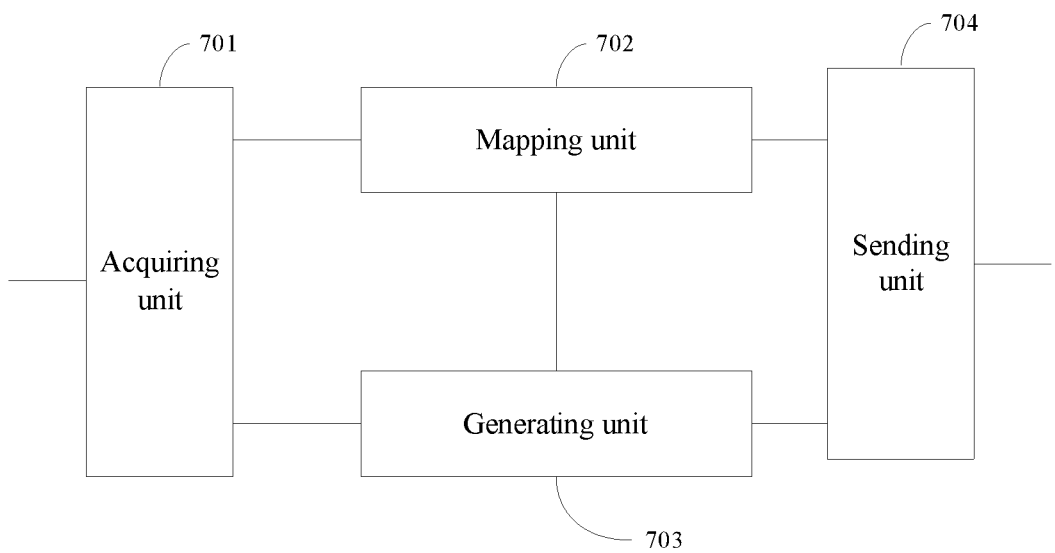
FIG. 7 is a schematic structural diagram of a server side provided by an embodiment of the present disclosure.

Based on the same inventive concept, an embodiment of the present disclosure provides a server side. The implementation of a heat map generation method of the server side may refer to the description of the method embodiment part, and the repetitions are omitted. Please refer to FIG. 7, the server side includes:

an acquiring unit 701, configured to acquire heat data generated in a designated geographic space within each preset time period, where the heat data is configured to represent total heat data of a kind of object in each unit space in the geographic space within the preset time period;

a mapping unit 702, configured to map each unit space with pixels in a designated display area, and obtain heat data of the pixels corresponding to the each unit space according to heat data corresponding to the each unit space, where the designated display area and the designated geographic space have a same ratio, and the designated display area is part of a display area in a front-end display;

a generating unit 703, configured to determine a color value corresponding to each pixel according to the heat data corresponding to each pixel, and a level threshold of a color gradation, and generate a heat map corresponding to the designated geographic space in each preset time period according to the color value corresponding to each pixel; and a sending unit 704, configured to send the heat map to the front-end display.

In some embodiments, the heat map is a lattice diagram.

In some embodiments, the sending unit 704 is configured to: send the heat map in each preset time period to the front-end display for animation display.

In some embodiments, the generating unit 703 is further configured to:

determine a color value of each color level according to an initial color and grading quantity of the color gradation, and a color circle angle increment between two adjacent color levels in the color gradation, wherein the initial color is a color value corresponding to a lowest color level in the color gradation, and the color value is a hexadecimal color value; and determine the level threshold of each color level according to an initial threshold and the grading quantity, wherein the initial threshold is a level threshold corresponding to a highest color level in the color gradation, and increments of level thresholds of two adjacent color levels are same.

In some embodiments, the generating unit 703 is further configured to:

convert the initial color into hue-saturation-lightness (HSL), and acquire a hue H corresponding to the initial color;

determine a hue H of the highest color level according to the hue H corresponding to the initial color and the color circle angle increment;

obtain an HSL corresponding to the highest color level by taking a saturation S and lightness L corresponding to the initial color as a saturation S and lightness L of the highest grade of color level; and calculate color values of remaining color levels by adopting a Gradient algorithm according to the initial color and the HSL corresponding to the highest grade of color level.

In some embodiments, the generating unit 703 is further configured to:
  determine two level thresholds closest to the heat data of the pixel corresponding to each unit space; and
  determine a value of a transition color between the color levels corresponding to the two level thresholds as the color value corresponding to each pixel.

In some embodiments, the generating unit 703 is configured to:
  calculate a first difference value between the heat data corresponding to each pixel and a first level threshold, wherein the first level threshold is one of the two level thresholds;
  calculate a second difference value between the two level thresholds and a third difference value between the color values corresponding to the two color levels corresponding to the two level thresholds; and
  determine the color value corresponding to each pixel according to the first difference value, the second difference value and the third difference value, and the color value corresponding to the first level threshold, where a ratio of a fourth difference value to the third difference value is a same as a ratio of the first difference value to the second difference value, where the fourth difference is a difference between the color value corresponding to each pixel and the color value corresponding to the first level threshold.

In some embodiments, in response to the heat data of a pixel being greater than the initial threshold, determining the color value corresponding to the highest color level as the color value of the pixel.

In some embodiments, the generating unit 703 is further configured to:
  obtain a new heat map by performing Gaussian blur processing on the heat map according to a preset Gaussian threshold.

In some embodiments, the animation display adopts CSS animation, the CSS animation adopts a fade-out transition when playing the heat map, and a playing time interval between two adjacent heat maps is consistent.

Based on the same inventive concept, an embodiment of the present disclosure further provides a readable storage medium, including:
  a memory, wherein the memory is configured to store an instruction, and the instruction, when executed by a processor, causes an apparatus including the readable storage medium to implement the heat map generation method described above.

The skilled in the art should understand that embodiments of the present disclosure may be provided as a method, a system or a computer program product. Therefore, embodiments of the present disclosure can adopt forms of full hardware embodiments, full software embodiments, or embodiments combining software and hardware aspects. Moreover, the embodiments of the present disclosure can adopt a form of the computer program products implemented on one or more computer available storage media (including but not limited to a disk memory, CD-ROM, an optical memory and the like) containing computer available program codes.

Embodiments of the present disclosure are described with reference to flow diagrams and/or block diagrams of the methods, the devices (systems), and computer program products according to the embodiments of the present disclosure. It should be understood that each flow and/or block in the flow diagrams and/or the block diagrams and combinations of the flows and/or the blocks in the flow diagrams and/or the block diagrams can be implemented by computer program instructions. These computer program instructions may be provided to a processor of a general-purpose computer, a special-purpose computer, an embedded processing machine or other programmable data processing devices to generate a machine, such that the instructions, when executed by the processor of the computer or other programmable data processing devices, generate an apparatus for implementing functions designated in one or more flows in the flow diagrams and/or one or more blocks in the block diagrams.

These computer program instructions may also be stored in a computer readable memory which can guide the computer or other programmable data processing devices to work in a specific mode, thus the instructions stored in the computer readable memory generates an article of manufacture that includes an instruction apparatus that implements the functions designated in one or more flows in the flow diagrams and/or one or more blocks in the block diagrams.

These computer program instructions may also be loaded to the computer or other programmable data processing devices, so that a series of operating steps are executed on the computer or other programmable devices to generate computer-implemented processing, such that the instructions executed on the computer or other programmable devices provide steps for implementing the functions designated in one or more flows in the flow diagrams and/or one or more blocks in the block diagrams.

Obviously, those skilled in the art can make various modifications and variations to the present disclosure without departing from the spirit and scope of the present disclosure. In this way, if these modifications and variations of the present disclosure fall within the scope of the claims of the present disclosure and their equivalent art, the present disclosure also intends to contain these modifications and variations.

What is claimed is:

1. A heat map generation method, applied to a server side, comprising:
  acquiring heat data generated in a designated geographic space within preset time periods, wherein the heat data is configured to represent total heat data of a kind of object in each unit space in the geographic space within each of the preset time periods;
  mapping each unit space with pixels in a designated display area;
  obtaining heat data of the pixels corresponding to the each unit space according to heat data corresponding to the each unit space, wherein the designated display area and the designated geographic space have a same ratio, and the designated display area is part of a display area in a front-end display;
  determining a color value corresponding to each pixel according to the heat data corresponding to each pixel, and a level threshold of a color gradation;
  generating a heat map corresponding to the designated geographic space in each preset time period according to the color value corresponding to each pixel; and
  sending the heat map in each preset time period to the front-end display for animation display;
  wherein the animation display adopts CSS animation;
  the CSS animation adopts a fade-out transition when playing the heat map; and
  a playing time interval between two adjacent heat maps is consistent.

2. The method according to claim 1, wherein the heat map is a lattice diagram.

3. The method according to claim 1, wherein before determining the color value corresponding to each pixel, the method further comprises:
   determining a color value of each color level according to an initial color and grading quantity of the color gradation, and a color circle angle increment between two adjacent color levels in the color gradation, wherein the initial color is a color value corresponding to a lowest color level in the color gradation, and the color value is a hexadecimal color value; and
   determining the level threshold of each color level according to an initial threshold and the grading quantity, wherein the initial threshold is a level threshold corresponding to a highest color level in the color gradation, and increments of level thresholds of two adjacent color levels are same.

4. The method according to claim 3, wherein the determining the color value of each color level, comprises:
   converting the initial color into hue-saturation-lightness (HSL);
   acquiring a hue H corresponding to the initial color;
   determining a hue H of the highest color level according to the hue H corresponding to the initial color and the color circle angle increment;
   obtaining an HSL corresponding to the highest color level by taking a saturation S and lightness L corresponding to the initial color as a saturation S and lightness L of the highest grade of color level; and
   calculating color values of remaining color levels by adopting a Gradient algorithm according to the initial color and the HSL corresponding to the highest color level.

5. The method according to claim 3, wherein the determining the color value corresponding to each pixel, comprises:
   determining two level thresholds closest to the heat data of the pixel corresponding to each unit space; and
   determining a value of a transition color between color levels corresponding to the two level thresholds as the color value corresponding to each pixel.

6. The method according to claim 5, wherein the determining the value of the transition color between the color levels corresponding to the two level thresholds as the color value corresponding to each pixel, comprises:
   calculating a first difference value between the heat data corresponding to each pixel and a first level threshold, wherein the first level threshold is one of the two level thresholds;
   calculating a second difference value between the two level thresholds;
   calculating a third difference value between the color values corresponding to the two color levels corresponding to the two level thresholds; and
   determining the color value corresponding to each pixel according to the first difference value, the second difference value and the third difference value, and a color value corresponding to the first level threshold;
   wherein a ratio of a fourth difference value to the third difference value is a same as a ratio of the first difference value to the second difference value, wherein the fourth difference is a difference between the color value corresponding to each pixel and the color value corresponding to the first level threshold.

7. The method according to claim 6, further comprising:
   in response to the heat data of a pixel being greater than the initial threshold, determining the color value corresponding to the highest color level as the color value of the pixel.

8. The method according to claim 1, wherein after generating the heat map corresponding to the designated geographic space in each preset time period, the method further comprises:
   obtaining a new heat map by performing Gaussian blur processing on the heat map according to a preset Gaussian threshold.

9. A non-transitory computer readable storage medium, comprising a memory, wherein the memory is configured to store an instruction, and the instruction, when executed by a processor, causes an apparatus comprising the readable storage medium to implement the method according to claim 1.

10. A server side, comprising: a memory configured to store a computer readable program, and a processor, wherein the processor is configured to read the computer-readable program to perform following method steps:
    acquiring heat data generated in a designated geographic space within preset time periods, wherein the heat data is configured to represent total heat data of a kind of object in each unit space in the geographic space within each of the preset time periods;
    mapping each unit space with pixels in a designated display area, and obtaining heat data of the pixels corresponding to the each unit space according to heat data corresponding to the each unit space, wherein the designated display area and the designated geographic space have a same ratio, and the designated display area is part of a display area in a front-end display;
    determining a color value corresponding to each pixel according to the heat data corresponding to each pixel, and a level threshold of a color gradation, and generating a heat map corresponding to the designated geographic space in each preset time period according to the color value corresponding to each pixel;
    sending the heat map in each preset time period to the front-end display for animation display; and
    sending the heat map in each preset time period to the front-end display for animation display;
    wherein the animation display adopts CSS animation;
    the CSS animation adopts a fade-out transition when playing the heat map; and
    a playing time interval between two adjacent heat maps is consistent.

11. The server side according to claim 10, wherein the heat map is a lattice diagram.

12. The server side according to claim 10, wherein before determining the color value corresponding to each pixel, the processor is configured to read the computer-readable program to perform following method steps:
    determining a color value of each color level according to an initial color and grading quantity of the color gradation, and a color circle angle increment between two adjacent color levels in the color gradation, wherein the initial color is a color value corresponding to a lowest color level in the color gradation, and the color value is a hexadecimal color value; and
    determining the level threshold of each color level according to an initial threshold and the grading quantity, wherein the initial threshold is a level threshold corresponding to a highest color level in the color gradation, and increments of level thresholds of two adjacent color levels are same.

13. The server side according to claim 12, wherein the processor is configured to read the computer-readable program to determine the color value of each color level, by:
  converting the initial color into hue-saturation-lightness (HSL);
  acquiring a hue H corresponding to the initial color;
  determining a hue H of the highest color level according to the hue H corresponding to the initial color and the color circle angle increment;
  obtaining an HSL corresponding to the highest color level by taking a saturation S and lightness L corresponding to the initial color as a saturation S and lightness L of the highest grade of color level; and
  calculating color values of remaining color levels by adopting a Gradient algorithm according to the initial color and the HSL corresponding to the highest color level.

14. The server side according to claim 12, wherein the processor is configured to read the computer-readable program to determine the color value corresponding to each pixel, by:
  determining two level thresholds closest to the heat data of the pixel corresponding to each unit space; and
  determining a value of a transition color between color levels corresponding to the two level thresholds as the color value corresponding to each pixel.

15. The server side according to claim 14, wherein the processor is configured to read the computer-readable program to determine the value of the transition color between the color levels corresponding to the two level thresholds as the color value corresponding to each pixel, by:
  calculating a first difference value between the heat data corresponding to each pixel and a first level threshold, wherein the first level threshold is one of the two level thresholds;
  calculating a second difference value between the two level thresholds;
  calculating a third difference value between the color values corresponding to the two color levels corresponding to the two level thresholds; and
  determining the color value corresponding to each pixel according to the first difference value, the second difference value and the third difference value, and a color value corresponding to the first level threshold;
  wherein a ratio of a fourth difference value to the third difference value is a same as a ratio of the first difference value to the second difference value, wherein the fourth difference is a difference between the color value corresponding to each pixel and the color value corresponding to the first level threshold.

16. The server side according to claim 15, wherein the processor is configured to read the computer-readable program to perform following method steps:
  in response to the heat data of a pixel being greater than the initial threshold, determining the color value corresponding to the highest color level as the color value of the pixel.

17. The server side according to claim 10, wherein after generating the heat map corresponding to the designated geographic space in each preset time period, the processor is configured to read the computer-readable program to perform following method steps:
  obtaining a new heat map by performing Gaussian blur processing on the heat map according to a preset Gaussian threshold.

* * * * *